United States Patent [19]

Poullain et al.

[11] Patent Number: 4,709,237
[45] Date of Patent: Nov. 24, 1987

[54] DEVICE FOR ELIMINATING LOW FREQUENCY NOISE FROM A TRANSMISSION SYSTEM, IN PARTICULAR 1/F NOISE IN A HOMODYNE RADAR RECEIVER

[75] Inventors: Michel Poullain, Meudon; Alain Marcuard, Bievres, both of France

[73] Assignee: LMT Radio Professionnelle, Boulogne Billancourt, France

[21] Appl. No.: 803,977

[22] Filed: Dec. 3, 1985

[30] Foreign Application Priority Data

Dec. 6, 1984 [FR] France .................................. 84 18642

[51] Int. Cl.$^4$ .............................................. G01S 7/28
[52] U.S. Cl. ..................................... 342/203; 342/192; 375/57
[58] Field of Search ....................... 343/17.2 PC, 17.5; 375/57, 58; 342/131, 132, 134, 159, 192, 193, 195, 200-204, 104

[56] References Cited

U.S. PATENT DOCUMENTS 3,332,077  7/1967  Nard et al. ......................... 343/7 PF
4,404,562  9/1983  Kretschmer, Jr. et al. ........ 343/17.2 PC
4,439,766  3/1984  Kobayashi et al. .................. 342/104

FOREIGN PATENT DOCUMENTS 1587357  4/1981  United Kingdom .

OTHER PUBLICATIONS

M. Skolnik, Intro. to Radar Systems; pp. 290–291; (McGraw-Hill, 1980).
NASA Techbrief, No. NTN83-0333, 1983 Lyndon B. Johnson Space Center, Houston, Tex. U.S. "Pulsed Phase Shifter Improves Doppler Radar".

Primary Examiner—T. H. Tubbesing
Assistant Examiner—Bernarr Earl Gregory
Attorney, Agent, or Firm—Oblon, Fisher, Spivak, McClelland, & Maier

[57] ABSTRACT

Device for eliminating the noise in 1/f from a Doppler radar comprising in the HF emitting system, a phase coder introducing, at frequency PRF/2 a phase shift of 0 and $\pi$ alternately, and in the receiving system, after the receiver, a decoder, or gain inverter progrmmable between $-1$ and $+1$, acting, in the same manner as the coder, upon the receiving signal and comprising a low-pass filter downstream from the decoder for eliminating the noise in 1/f, that appears at PRF/2, the device being applied to a ground surveying radar.

6 Claims, 6 Drawing Figures

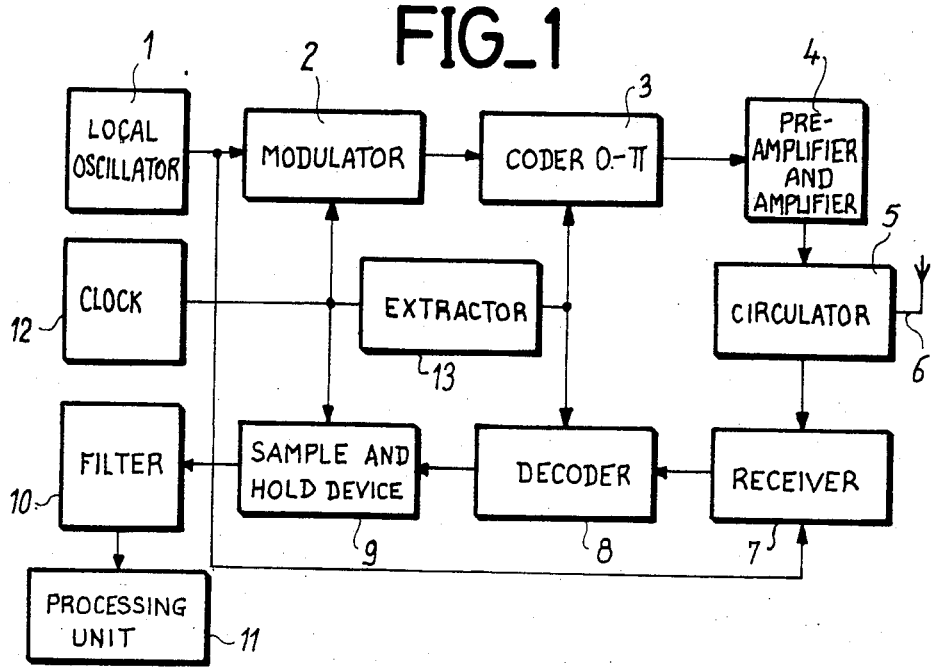
FIG_1
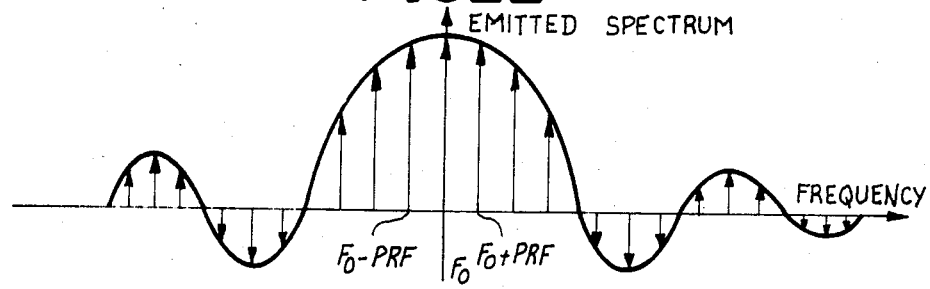
FIG_2
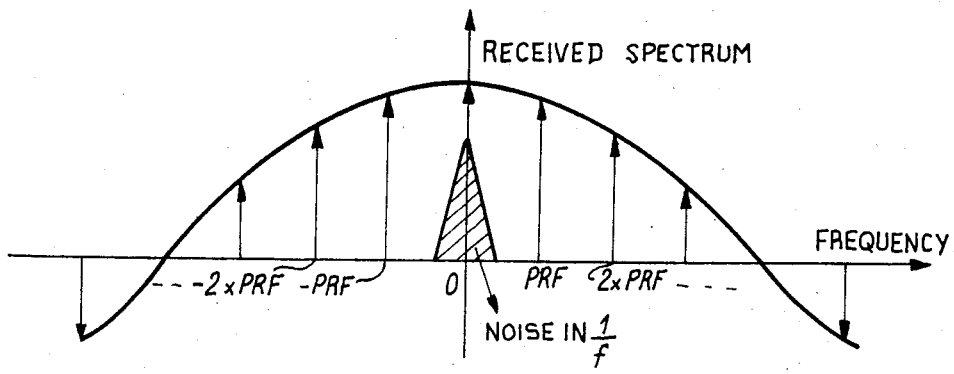
FIG_3

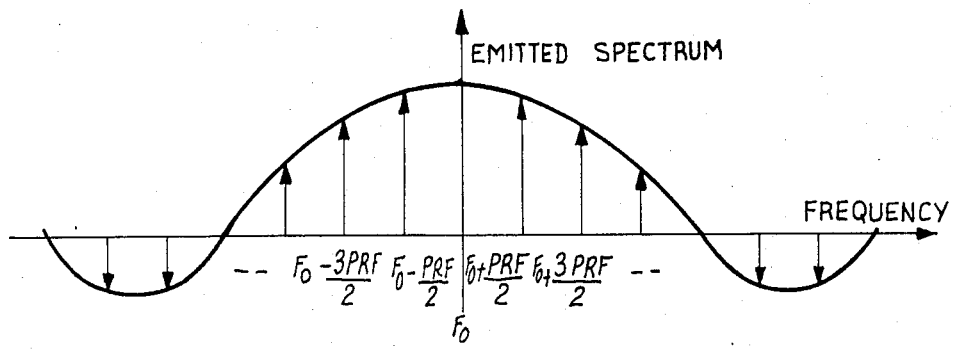
FIG_4
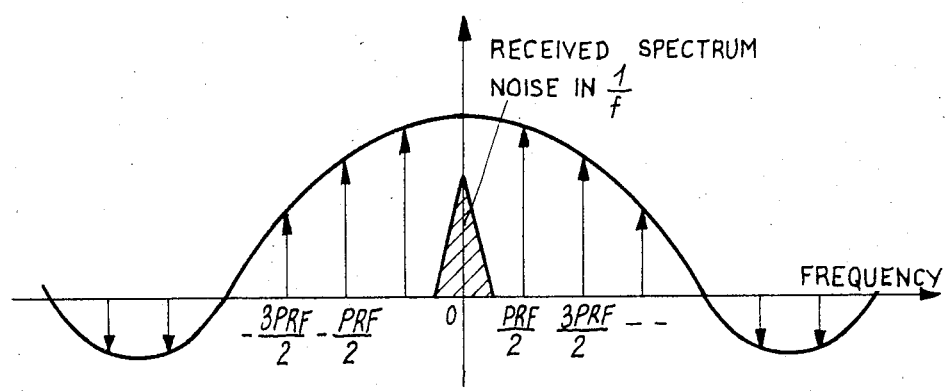
FIG_5
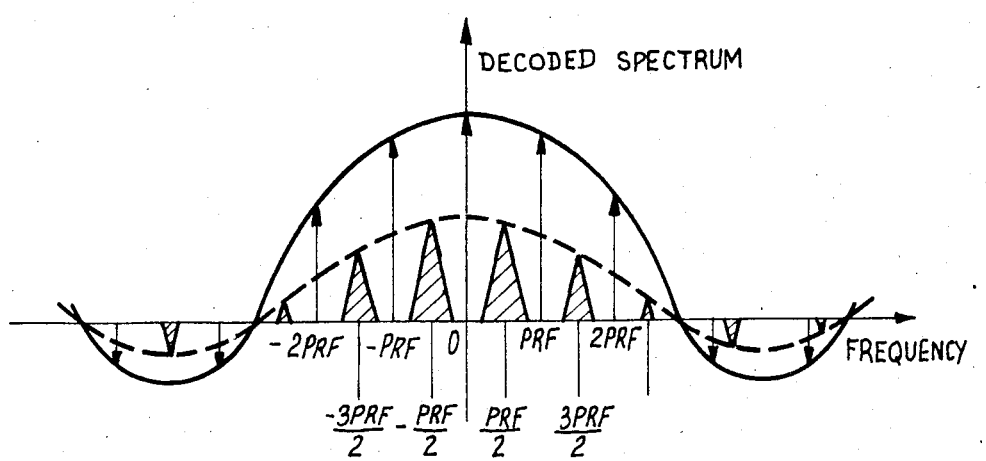
FIG_6

DEVICE FOR ELIMINATING LOW FREQUENCY NOISE FROM A TRANSMISSION SYSTEM, IN PARTICULAR 1/F NOISE IN A HOMODYNE RADAR RECEIVER

BACKGROUND OF THE INVENTION

1. Field of the invention

The present invention concerns a device for eliminating low frequency interference noise from a transmission system, and in particular 1/f noise within a homodyne radar receiver.

2. Description of the prior art

Within a homodyne receiver, the frequency change restores the base band, i.e. the intermediate frequency is zero. The application of homodyne receiving to Doppler pulse radars, for ground-to-air surveillance, intended to identify targets of very low radial velocity, requires a processing capacity which is practically homogeneous from the continuous frequency up to the repetition half-frequency of the emission signal. More especially, the constant detection probability processing of a given equivalent radar surface being able to be displaced at variable radial speed supposes the invariance of the signal/noise ratio of the target over the whole length of the spectrum to be analysed (above all, in the event where the processing of the signal received by the radar utilizes a spectrum analyser). The noise acting on the signal received is formed more specifically by the thermal noise of the receiver, which has hardly any dependance upon the frequency in the band frequency involved, and by the noise due to the semi-conductors utilized in the first stages of the receiver, this noise being inversely proportional to the frequency 1/f such that this noise becomes equal to the thermal noise of the receiver at a frequency of several hundred Hertz and thereafter increases by 3 dB per decreasing octave, according to a well-known asymptotic curve of order 1. This noise in 1/f is that much more likely to impair performances as it is standard to operate radar with a noise/signal ratio close to 0 dB. An increase of the noise in a given frequency range can thus mean the loss of echoes in this frequency range.

In order to achieve the said invariance of the noise signal ratio, it is necessary to eliminate the noise in 1/f. A simple filtering of the disturbed frequency zone renders it possible to suppress the noise, thus not to provoke an inacceptable rise in the rate of false alarms, but the noise/signal ratio in this frequency range is not improved due to the fact the signal has simultaneously been attenuated, and consequently it is not possible to carry out a correct analysis of the useful signal.

The object of present invention is a circuit that is easy to produce and which allows simply and inexpensively to suppress practically all the low frequency noise present in transmitting-receiving system, between the beginning of the amplifier stages of the transmitter and the final amplification stages of the receiver.

SUMMARY OF THE INVENTION

In a transmitter-receiver system the emitted signal of which is a carrier frequency Fo, possibly modulated and/or coded, chopped at a repetition frequency PRF by time slots of width to, the invention foresees connecting in the transmitting circuit a coder device acting, according to two complementary values, upon the emitted signal, these two values being alternately introduced at a frequency lower than or equal to PRF/2 and connecting in the receiving circuit a decoder device acting, in the same way as the coder device, upon the received signal, and followed by a sample-and-hold device and a low-pass filter.

BRIEF DESCRIPTION OF THE DRAWINGS

The present invention will become more apparent through reading the following detailed description of an embodiment given as a nonlimitative example and illustrated by the appended drawing, in which:

FIG. 1 is a block-diagram of the said embodiment which is here a Doppler effect radar with homodyne receiver according to the invention;

FIGS. 2 and 3 are frequential diagrams of the spectra respectively of the signal transmitted and of the signal received by the Doppler effect radar with homodyne receiver according to the prior art and;

FIGS. 4 to 6 are frequential diagrams of the spectra respectively of the emitted signal, of the received signal and of the decoded signal in the radar system according to FIG. 1.

DESCRIPTION OF THE PREFERRED EMBODIMENT

The invention will be explained herein-below with reference to a Doppler-effect radar with homodyne receiver, but it is well understood that it can apply to other types of transmitter-receiver systems in which it is sought to eliminate an end band noise, provided that these systems transmit signals in the form of regular time slots chopping a carrier frequency, possibly modulated and/or coded, such as, for example, digital data transmission systems.

The Doppler radar system, represented in the form of a block-diagram in FIG. 1, comprises a local oscillating device 1 acting upon receiver 1 and a modulator 2 which is connected, through a coder 3, to a transmitting preamplifier-amplifier 4. The output of the amplifier 4 is connected through a circulator 5 to a transmitter-receiver aerial 6. The signals received by the aerial 6 pass through the circulator 5 and arrive at a homodyne receiver 7. The output of the receiver 7 is connected via a decoder 8 to the input of a sample-and-hold device 9, the output of which is connected, via a low-pass filter 10 to a processing unit 11.

The radar system also comprises a clock circuit 12, determining the repetition frequency of the radar transmitting pulses (generally referred to as PRF) connected to the modulator 2 as well as to a circuit 13 for extracting the synchronisation signal and to circuit 9.

Elements 1, 2, 4, 5, 6, 7, 9, 11 and 12 are those normally constituting a conventional Doppler radar system, and will not be described in further detail. Novel elements 3, 8, 10 and 13 which form part of the invention, will be described herein-below.

The coder 3 is, in the present case, a phase coder producing a phase shift of 0° and 180° alternately, of the output signal of the modulator 2 and this, for reasons set out herein-below, at the rhythm of the semi-frequency of the clock frequency 12, i.e. PRF/2. This coder advantageously comprises a PIN diode phase shifter, the production details of which are obvious to the man skilled in the art.

Decoder 8 produces, in the same way as coder 3, a phase shift of 0° and 180° alternately, of the output signal of the receiver 7. According to one embodiment of the invention, this decoder 8 is a video-frequency amplifier having a programmable amplification factor of either +1 or −1. The decoder is also controlled at the rhythm of PRF/2. The filter 10 in the present case, is a low-pass filter, that advantageously comprises, in a manner known per se, active filters with operational amplifiers. The extractor circuit 3 is, in the present case, a simple divider by 2 of the clock frequency supplied by the circuit 12. If the source of the clock signals was not accessible, e.g. in the case of a receiver remote from the transmitter, in order to synchronise the decoder 8 and where necessary, the coder 3, it would be necessary to utilize a suitable circuit for restoring the clock signal, the production of which will be obvious for the man skilled in the art.

The working of the device described herein-below will now be explained, firstly without either coder 3 or decoder 8, thereafter comprising both these elements.

In the conventional case in which the signal transmitted by the radar is a carrier frequency Fo chopped at the frequency PRF by a time-slot of width to, the transmitted spectrum is, a represented on FIG. 2, a group of equidistant spectral lines centred upon Fo, the distance between the adjacent lines being equal to PRF. The envelope of this spectrum is a function having the form $\sin x/x$ with $x = \pi to(f-Fo)$, f being the frequency.

As it is known from the prior art, this transmitted signal, when sent back by a moving target at a velocity v, is transposed in frequency by a value $2v/\lambda = 2vFo/C$, $\lambda$ being the transmitted wave length and C the celerity of the light. The spectrum of the echo sent back by such a target is deduced through simple translation of the spectrum of FIG. 2, with respect to the abscissae of the spectral lines. However, for enhanced simplicity, it has been supposed that the target is steady, i.e. $v = 0$. The spectrum of the echo is thus similar to that of the transmitted signal, except for the amplitudes.

Upon reception, in the case of a homodyne receiver, the spectrum is transposed by $-Fo$, thereby introducing a noise in 1/f. The lines spectrum at the output of receiver 7 has the shape represented in FIG. 3, centered upon a zero frequency, and still having an envelope in the form $\sin x/x$. The spectral lines are all at a distance from PRF, and the noise in 1/f is superimposed upon the useful central line at the zero frequency. At the end of the sample-and-hold device 9, all the spectral lines are folded over at the zero frequency.

With the coder device according to the invention, which, upon emitting, reverses the carrier frequency phase at each radar pulse, the spectrum of the signal transmitted is such as represented in FIG. 4. This spectrum is the result of the convolution of the spectrum represented in FIG. 2 by the frequential spectrum resulting from the doubling out of each spectral line into an infinite number of spectral lines mutually distant from the PRF. Indeed, the action of the coder 3 is assimilable to an amplitude modulation with suppressed carrier frequency through the balanced mixture between the carrier frequency and a rectangular signal of the repetition frequency equal to PRF/2. The spectrum of the spectral lines of FIG. 4 is centered upon frequency Fo, the first two lines being at Fo +PRF/2 and Fo−PRF/2. The envelope of this spectrum is always the Fourier transform of the pulse or time-slot of width to of chopping the carrier frequency Fo, i.e. of the form $\sin x/x$.

At the output of receiver 7, a spectrum of spectral lines is obtained, as represented in FIG. 5, similar to that of the transmitted signal, centered upon the zero frequency but with noise in 1/f superimposed upon the band of zero frequency. The decoder 8 having an action that is complementary to that of the coder 3, the spectrum at its output is such as represented in FIG. 6. This double spectrum is always centered upon a spectral line of zero frequency, and is consists of a first series of spectral lines of useful signal, comprising the zero frequency line, mutually distant from PRF, and forming a spectrum practically identical to that represented in FIG. 3, and of a second series of narrow zones of noise, similar to that of the noise superimposed upon the spectral line of zero frequency of the spectrum at the output of the receiver 7, but having lower amplitudes. No noise zone is superimposed upon the central spectral line of zero frequency. The two noise zones closest to this central spectral line are disposed symmetrically with respect to this latter and centered upon frequencies PRF/2 and - PRF/2 respectively. The following noise zones are regularly situated at intervals equal to PRF. The envelope of this series of noise zones is also in the form of $\sin x/x$.

With respect to the useful signal, the spectrum of FIG. 6 is practically identical to that of FIG. 3. The coding according to the invention is therefore transparent to the Doppler signals of the radar, and it can be compatible with a coding system incorporated within conventional radar systems, such as a Barker type coding phase upon transmitting.

At the output of the sample-and-hold device 9, operating at frequency PRF, a pure spectral line at zero frequency is obtained, as well as a noise in 1/f transposed by PRF/2. This noise component is practically eliminated by the low-pass filter 10. This filter comprises advantageously a CAUER-type filtering circuit with a zero at PRF/2.

The quality of the rejection of the noise component, centered upon the zero frequency at the output of circuit 9, resides essentially upon the performances of the inverter 8. In fact, let it be supposed that the gain or amplification factor of this inverter is $1 + \epsilon$ or $-1$, $\epsilon$ representing the differential gain of the inverter. If Ao is the amplitude of the noise component in 1/f of zero frequency, it is possible to recover at the output of the inverter 8 a noise component in 1/f, centered upon the zero frequency, amplitude Ao. $\epsilon/2$. If the chopping frequency of the high-pass indicator MTI (moving target indicator) of the radar is limited for example to 30 Hz, the noise in 1/f will be 10 dB higher than the thermal noise at this frequency. In order to cause to disappear the noise in 1/f in the thermal noise at the output of inverter 8, it is sufficient that the differential gain $\epsilon$ be lower than $-30$ dB. The total noise density at 30 Hz is thus of 0.1 dB higher than the thermal noise density alone, which may be considered as satisfactory. In practice, the use of a programmable inverter, such as a switching device in C-MOS integrated circuit of Motorola or Analog Devices, provided, in a manner known per se, with resistances at 1%, allow to obtain, for the attenuation of the noise in 1/f, a value varying between $-30$ and $-40$ dB.

The performances of the coder 3 have no influence upon the rejection of the noise in 1/f, but upon the appearance of the Doppler components of the frequencies:

$$\ldots \frac{-3}{2} PRF, \frac{-1}{2} PRF, \frac{+1}{2} PRF, \frac{+3}{2} PRF, \ldots$$

superimpodsed upon the noise components in 1/f at the input of the inverter 8, and which are eliminated by the filter 10. Since all the energy is no longer present in the useful lines of multiple frequencies of PRF, there is thus a slight attenuation of the useful signal.

If $\pi$ or $\epsilon$ represents the phase expressed in radians of the carrier frequency at the output of the coder 3 with respect to the reference carrier frequency present at the input of this coder, the phase demodulator of the receiver thus delivers a relative level of steady echo varying between $-1$ and $\cos \epsilon \simeq 1 - \epsilon^2/2$. The relative mean level of the steady echo at the output of the inverter 8 is thus $1 - \epsilon^2/4$ and not 1. If $\epsilon^2/4 = 0.01$ is accepted (decrease by 0.1 dB of the level of the echoes), the result is $\epsilon = 0.2$ radian, which means that the coder 3 can introduce a phase error of about 11.5 angle degrees with respect to the actual programmed angles, that have values of 0 and $\pi$, without impairing the processing performances. In practice, this error never exceeds more than a few degrees.

The phase coder 3 can also generate an interference amplitude modulation of the carrier frequency, but it is easy to become independent thereof by connecting after it a peak limiter stage (not represented).

We claim:

1. Device for eliminating low frequency noise from a transmission system, in particular noise in 1/f in a homodyne radar receiver the transmitted signal which is a frequency Fo carrier, modulated, chopped at a repetition frequency PRF by time-slots of width to, wherein said device comprises in the transmitting circuit a coder device acting, according to two complementary values, upon the transmitted signal, these two values being alternately introduced at a frequency at most equal to PRF/2 and in the receiving circuit a decoder acting in the same way as the coder device, upon the receiving signal, wherein the coder device and the decoder device each comprise a phase coder for phase shifting alternately by 0 and $\pi$, the transmitted and the received signal, respectively, and followed by a sample-and-hold device and a low-pass 2. Device according to claim 1, wherein the coder device is connected between a modulator circuit and a transmitting amplifier circuit, and the decoder device is connected at the output of the receiver of the receiving circuit.

3. Device according to claim 1, applied to a Doppler-type radar system, wherein the coder device is constituted by a PIN diode phase shift device and the decoder device is constituted by a video-frequency amplifier having a gain that is programmable between $+1$ and $-1$.

4. Device for eliminating low frequency noise from a transmission system, in particular noise in 1/f in a homodyne radar receiver the transmitted signal which is a frequency Fo carrier, coded, chopped at a repetition frequency PRF by time-slots of width to, wherein said device comprises in the transmitting circuit a coder device acting, according to two complementary values, upon the transmitted signal, these two values being alternately introduced at a frequency at most equal to PRF/2 and in the receiving circuit a decoder acting in the same way as the coder device, upon the receiving signal, wherein the coder device and the decoder device each comprise a phase coder for phase shifting alternately by 0 and $\pi$, the transmitted and the received signal, respectively, and followed by a sample-and-hold device and a low-pass filter.

5. Device according to claim 4 wherein the coder device is connected between a modulator circuit and a transmitting amplifier circuit, and the decoder device is connected at the output of the receiver of the receiving circuit.

6. Device according to claim 4, applied to a Doppler-type radar system, wherein the coder device is constituted by a PIN diode phase shift device and the decoder device is constituted by a video-frequency amplifier having a gain that is programmable between $+1$ and $-1$.

* * * * *